United States Patent Office.

HEINRICH TRAUN, OTTO TRAUN, AND MAX TRAUN, OF HARBURG-ON-ELBE, PRUSSIA, GERMANY.

ORNAMENTING HARD RUBBER.

SPECIFICATION forming part of Letters Patent No. 228,290, dated June 1, 1880.

Application filed March 30, 1880. (Specimens.) Patented in Germany April 4, 1879.

*To all whom it may concern:*

Be it known that we, HEINRICH TRAUN, OTTO TRAUN, and MAX TRAUN, citizens of the Empire of Germany, residing at Harburg-on-Elbe, in the Empire of Germany, have invented certain new and useful Improvements relating to the Process and Method of Ornamenting Hard Rubber or Vulcanite, for which we have received Letters Patent in Germany No. 7,565, dated April 4, 1879; and we do hereby declare that the following is a full, clear, and exact description thereof.

It has long been the desire of the trade to apply colors, for instance, on hard rubber or vulcanite jewelry in a durable manner. Heretofore all efforts made to this effect may be considered as good as failures, on account of the compact and impenetrable surface peculiar to all vulcanized hard rubber or vulcanite compounds, or their equivalents, also on account of their indifference against the actions of chemicals.

All colors applied by direct painting, printing, or metachromotyping on the surface of already-vulcanized hard rubber or vulcanite wear off rapidly when the article is in use, and even a good varnish will only afford imperfect protection. For this reason all painted articles of hard rubber or vulcanite have had but a short duration on the market.

We have succeeded in overcoming these difficulties by our new method, called by us "vulcanography." This method consists in applying the colors or bronzes to the surface of the hard rubber or vulcanite compound, or its equivalents, while in its soft state—that is, before vulcanization—either by printing, painting, or by metachromotypy, and thereafter fixing said colors or bronzes on the surface of the hard rubber or vulcanite by action of the vulcanization itself.

We claim as our invention—

Adorning the surface of hard rubber or vulcanite compounds, or their equivalents, with colored or bronze ornamentation, writing, pictures, or such like before vulcanization, and fixing said ornamentation, colors, bronzes, writing, pictures, or such like on the hard rubber or vulcanite surface by action of the vulcanization itself.

In testimony whereof we have hereunto set our hands at Hamburg, Germany, this 3d day of March, 1880, in the presence of two subscribing witnesses.

HEINR. TRAUN.
     OTTO TRAUN.
     MAX TRAUN.

Witnesses:
 HERMANN COLPE,
 XAVER NIEDERBUCHNER,
   *Both of Harburg-on-Elbe.*